United States Patent [19]

Ellgen

[11] Patent Number: 5,605,773

[45] Date of Patent: Feb. 25, 1997

[54] LITHIUM MANGANESE OXIDE COMPOUND AND METHOD OF PREPARATION

[75] Inventor: Paul C. Ellgen, Oklahoma City, Okla.

[73] Assignee: Kerr-McGee Corporation, Oklahoma City, Okla.

[21] Appl. No.: 568,225

[22] Filed: Dec. 6, 1995

[51] Int. Cl.⁶ .......................... H01M 10/40; H01M 4/50
[52] U.S. Cl. .......................... 429/194; 429/218; 429/224; 423/596; 423/641
[58] Field of Search .................................. 429/224, 194, 429/218; 423/49, 593, 596, 599, 605, 641

[56] References Cited

U.S. PATENT DOCUMENTS

| | | | |
|---|---|---|---|
| 4,828,834 | 5/1989 | Nagaura et al. | 429/224 X |
| 4,904,552 | 2/1990 | Furukawa et al. | 429/224 X |
| 4,980,251 | 12/1990 | Thackeray et al. | 429/224 X |
| 5,084,366 | 1/1992 | Toyoguchi | 429/224 |
| 5,135,732 | 8/1992 | Barboux et al. | 423/593 |

*Primary Examiner*—Anthony Skapars
*Attorney, Agent, or Firm*—Herbert M. Hanegan; J. Rodgers Lunsford, III

[57] ABSTRACT

A method for manufacturing $Li_2M_bMn_{2-b}O_4$ comprising the steps of providing $LiM_bMn_{2-b}O_4$; providing a source of lithium; dissolving lithium from the lithium source in a liquid medium in which lithium generates solvated electrons or the reduced form of an electron-transfer catalyst; and contacting the $LiM_bMn_{2-b}O_4$ with the liquid medium containing the dissolved lithium and the solvated electrons or the reduced form of the electron-transfer catalyst, wherein M is selected from the group Al, Ti, V, Cr, Fe, Co, Ni, and Cu.

48 Claims, No Drawings

LITHIUM MANGANESE OXIDE COMPOUND AND METHOD OF PREPARATION

FIELD OF THE INVENTION

The present invention relates to lithiated multicomponent manganese oxide compounds ($Li_2M_bMn_{2-b}O_4$) and their production by contacting $Li_2M_bMn_{2-b}O_4$ with lithium dissolved in a solvent in which lithium generates solvated electrons or in which a catalyst is present that is capable of accepting an electron from lithium and delivering it to the $Li_2M_bMn_{2-b}O_4$.

BACKGROUND OF THE INVENTION

The present invention relates to lithiated multicomponent manganese oxides, to methods of making such materials and to the use of such materials in the manufacture of battery cathodes and electrodes for other purposes such as in electrochemical cells.

More particularly it relates to a process for the manufacture of $Li_2M_bMn_{2-b}O_4$ and the use of $Li_2M_bMn_{2-b}O_4$ in electrical storage batteries. Still more particularly, it relates to a process for the manufacture of $Li_2M_bMn_{2-b}O_4$ by the reaction of $Li_2M_bMn_{2-b}O_4$ with lithium and to using $Li_2M_bMn_{2-b}O_4$ in the manufacturing of the cathode component of rechargeable lithium-ion electrical storage batteries.

Conventionally used nonaqueous electrolyte cells are primary cells which can be used only once. With recent widespread use of video cameras and small audio instruments, there has been an increased need for secondary cells which can be used conveniently and economically over many charge-discharge cycles.

Lithium cells useful as electrical storage batteries incorporate a metallic lithium anode and a cathode including an active material which can take up lithium ions. An electrolyte incorporating lithium ions is disposed in contact with the anode and the cathode. During discharge of the cells, lithium ions leave the anode, enter the electrolyte and are taken up in the active material of the cathode, resulting in release of electrical energy. Provided that the reaction between the lithium ions and the cathode active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as secondary cells.

It has long been known that useful cells can be made with a lithium metal anode and a cathode material which is a sulfide or oxide of a transition metal, i.e., a metal capable of assuming plural different valence states. Dampier, "The Cathodic Behavior of CuS, $MoO_3$, and $MnO_2$ in Lithium Cells," *J. Electrochem. Soc.*, Vol. 121, No. 5, pp. 656–660 (1974) teaches that a cell incorporating a lithium anode and manganese dioxide cathode-active material can be used as an electrical power source. The same reference further teaches that a lithium and manganese dioxide cell can serve as a secondary battery.

There has been considerable effort in the battery field directed towards development of cathode materials based on lithium manganese oxides. Both lithium and manganese dioxide are relatively inexpensive, readily obtainable materials, offering the promise of a useful, potent battery at low cost. Nonaqueous electrolyte primary cells using lithium as a negative electrodeactive material and nonaqueous solvent such as an organic solvent as an electrolyte medium have advantages in that self-discharge is low, nominal potential is high and storability is excellent. Typical examples of such nonaqueous electrolyte cells include lithium manganese dioxide primary cells which are widely used as current sources for clocks and memory backup of electronic instruments because of their long-term reliability.

Secondary lithium batteries using an intercalation compound as cathode and free lithium metal as anode have been studied intensively due to their potential technological significance. Unfortunately, these studies have revealed that inherent dangers associated with the use of free lithium discourage the use of such batteries in general consumer applications. Upon repeated cycling, dendritic growth of lithium occurs at the lithium electrode. Growth of lithium dendrites can lead eventually to an internal short-circuit in the cell with a subsequent hazardous uncontrolled release of the cell's stored energy.

One approach to improving the reversibility of lithium-based anodes involves the use of lithium intercalation compounds. The intercalation compound serves as a host structure for lithium ions which are either stored or released depending on the polarity of an externally applied potential. During discharge the electromotive force reverses the forced intercalation thereby producing current.

Batteries using this approach, in which an intercalation compound is used as the anode instead of free lithium metal, are known in the art as "lithium-ion" or "rocking-chair" batteries. Utilization of $Li_2Mn_2O_4$ in lithium-ion secondary batteries is described in detail in the recent review paper, "The $Li_{1+x}Mn_2O_4$/C Rocking-chair System," J. M. Tarascon and D. Guyomard, *Electrochimicaacta*, Vol. 38, No. 9, pp. 1221–1231 (1993).

In this approach, a nonaqueous secondary cell is provided with (a) a negative electrode consisting essentially of a carbonaceous material as a carrier for a negative electrode-active material, said carrier being capable of being doped and dedoped with lithium and (b) a positive electrode comprising lithium manganese complex oxide as an essential positive electrode-active material. This cell has a high expected applicability because dendrite precipitation of lithium does not occur on the surface of the negative electrode, the pulverization of lithium is inhibited, the discharge characteristics are good and the energy density is high.

The output voltage of this lithium-ion battery is defined by the difference in chemical potential of the two insertion compounds. Accordingly, the cathode and anode must comprise intercalation compounds that can intercalate lithium at high and low voltages, respectively.

The viability of this concept has been demonstrated and future commercialization of such cells in D, AA or coin-type batteries has been indicated. These cells include a $LiMn_2O_4$, a $LiCoO_2$ or a $LiNiO_2$ cathode, an electrolyte and a carbon anode. These lithium-ion batteries are thought to be superior to nickel-cadmium cells, and they do not require a controlled environment for fabrication because the lithium based cathode is stable in an ambient atmosphere, and the anode is not free lithium metal, but an intercalation compound used in its discharged state (without intercalated lithium) that is also stable in an ambient atmosphere.

However, a nonaqueous electrolyte secondary cell such as described above has disadvantages in that some cell capacity is lost because some of the lithium doped into the carbonaceous material used as a negative electrode active material cannot be dedoped upon discharge. In practice, either carbon or graphite irreversibly consumes a portion of the lithium during the first charge-discharge cycle. As a result the capacity of the electrochemical cell is decreased in proportion to the lithium that is irreversibly intercalated into the carbon during the first charge.

This disadvantage can be eliminated by using $Li_2Mn_2O_4$ as all or part of the cathode. Upon the first charge of the cell so manufactured, the $Li_2Mn_2O_4$ is converted to $\lambda\text{-}Mn_2O_4$. When the cell is operated over the appropriate range of electrical potential, subsequent discharge cycles of the cell convert $\lambda\text{-}Mn_2O_4$ to $LiMn_2O_4$, and charge cycles convert $LiMn_2O_4$ to $\lambda\text{-}Mn_2O_4$. Because excess lithium is available to satisfy the irreversible consumption by carbon or graphite, cells manufactured using $Li_2Mn_2O_4$ have greater electrical capacity.

The capacity of a lithium ion cell is also limited by the quantity of lithium which can be reversibly removed (i.e, cycled) from the cathode. In the cathode materials of the prior art, only about one half mole of lithium per transition metal can be removed reversibly. Thus, they have limited specific capacity, generally no more than about 140 mAh/g.

In principle, one mole of lithium per mole of manganese can be removed reversibly from $Li_2Mn_2O_4$. In practice, however, cells that cycle between $Li_2Mn_2O_4$ and $LiMn_2O_4$ suffer more rapid loss of electrical capacity than cells that cycle between $LiMn_2O_4$ and $\lambda\text{-}Min_2O_4$. Moreover, cells that cycle between $LiMn_2O_4$ and $\lambda\text{-}Min_2O_4$ deliver most of their electrical energy between about 4 volts and about 3 volts, whereas, cells that cycle between $Li_2Mn_2O_4$ and $LiMn_2O_4$ deliver most of their electrical energy between about 3 volts and about 2 volts.

Thus, a combination of factors gives a lithium-ion cell that cycles lithium between a carbon or graphite matrix as the anode and $LiMn_2O_4$ as the fully discharged cathode many particularly attractive features. Such cells can be assembled conveniently in an over-discharged state using carbon or graphite for the anode and $Li_2Mn_2O_4$ for the cathode. Because the second lithium ion cannot be used effectively for repeated cycling, its consumption to satisfy the irreversible lithium intercalation of the carbonaceous anode material does not entail any additional loss of electrical capacity.

The compounds $LiMn_2O_4$ and $Li_2Mn_2O_4$ that are useful in this application are known in the art. Depending upon methods of preparation, their stoichiometries can differ slightly from the ideal. They are precisely identified however by their x-ray powder diffraction patterns. The materials herein referred to as $LiMn_2O_4$ and $Li_2Mn_2O_4$ have the diffraction spectra given on cards 35-781 and 38-299, respectively, of the Powder Diffraction File published by the International Centre for Diffraction Data, Newtown Square Corporate Campus, 12 Campus Boulevard, Downtown Square, Pa., 19073-3273, USA. The materials designated $LiM_bMn_{2-b}O_4$ and $Li_2M_bMn_{2-b}O_4$, in which M represents a metal other than manganese, which are the subject of this invention, are essentially insostructural with $LiM_bMn_{2-b}O_4$ and $Li_2M_bMn_{2-b}O_4$, respectively, and have powder diffraction spectra which differ from those of $LiMn_2O_4$ and $Li_2Mn_2O_4$ only by small displacements of corresponding diffraction peaks and small differences in their relative intensities.

$LiMn_2O_4$ can be prepared from a wide range of lithium sources and a wide range of manganese sources under a wide range of conditions. U.S. Pat. No. 5,135,732 discloses a method for the low temperature preparation of $LiMn_2O_4$. The materials $LiM_bMn_{2-b}O_4$ can be prepared under a wide range of conditions by replacing an amount of the manganese source corresponding to b moles of manganese per mole of lithium with an amount of a source of the alternative metal, M, corresponding to b moles of alternative metal per mole of lithium, Y. Bito, et. al., Proc.-Electrochem. Soc. (1993), 93–23,461–472; Y. Toyoguchi, U.S. Pat. No. 5,084,366, Jan. 28, 1992. The range of conditions over which $LiM_bMn_{2-b}O_4$ can be synthesized varies with the metal M and with b, the proportion of M in the compound. In general, the synthesis is more facile as the value of b is smaller. The compound $LiM_bMn_{2-b}O_4$ is a raw material for the present invention.

In contrast, $Li_2Mn_2O_4$ is more difficult to prepare and in fact, known methods for the preparation of $Li_2Mn_2O_4$ are excessively costly. Preparation of the substituted compounds $Li_2M_bMn_{2-b}O_4$ and their use in rechargeable batteries are the subjects of this invention. In the manufacture of cathodes for rechargeable lithium-ion batteries, this material has the advantages that accrue from the use of $Li_2Mn_2O_4$ as described above. Additionally, the $Li_2MbMn_{2-b}O_4$ materials produce cathodes which have either greater electrical storage capacity or superior cyclability or both compared to similarly prepared cathodes based on $Li_2Mn_2O_4$.

SUMMARY OF THE INVENTION

It is an object of the present invention to provide a nonaqueous electrolyte secondary cell having an increased cell capacity which comprises a negative electrode consisting essentially of a carrier for a negative electrode active material and a positive electrode comprising a substituted lithium manganese oxide as an essential positive electrode active material.

In accordance with the present invention, the above object can be accomplished by a lithiated multicomponent metal oxide of the formula $Li_2M_bMn_{2-b}O_4$ prepared by contacting $LiM_bMn_{2-b}O_4$ with lithium suspended or dissolved in a solvent in which lithium generates solvated electrons or in which a catalyst is present that is capable of accepting an electron from lithium and delivering it to the $LiM_bMn_{2-b}O_4$ reactant.

DESCRIPTION OF THE PREFERRED EMBODIMENT

As noted above, this invention is directed to a method of manufacturing a lithiated multicomponent metal oxide, $Li_2M_bMn_{2-b}O_4$. Specifically such method is accomplished by providing $LiM_bMLiM_bMn_{2-b}O_4$, a source of lithium, dissolving lithium from the lithium source in a liquid medium in which lithium generates solvated electrons or the reduced form of an electrontransfer catalyst and contacting the $LiM_bMn_{2-b}O_4$ with the lithium-containing liquid medium.

The source of lithium can be any source which makes elemental lithium available for reaction.

In accordance with the present invention lithium is dissolved by a solvent in which lithium generates solvated electrons or the reduced form of an electron-transfer catalyst and contacting the $LiM_bMn_{2-b}O_4$ with the dissolved lithium. Advantageously the solvent is selected from the group consisting of ammonia, organic amines, ethers, pyridine, substituted pyridines, mixtures of ammonia and amines, and mixtures of ammonia and ethers. Preferably the solvent is ammonia, organic amines, or pyridines. When the solvent is ammonia the contacting step is advantageously carrier out at a temperature of from about minus 30° C. to about minus 50° C. Preferably the temperature during the contacting step is maintained at from about minus 33° C. to about minus 45° C. When ammonia is the solvent it is preferred that it be in liquid form.

Optionally the liquid medium of the present invention can be a solvent having an electron transfer catalyst dissolved therein. The liquid medium may also be a mixture of compounds which is a liquid at the reaction temperature. Advantageously when such a liquid medium is employed, a catalyst selected from the group consisting of sulfur, sulfides, reducible sulfur compounds, iodine, iodides, reducible iodine compounds, pyridine, pyridine derivatives, and benzophenone is added to the liquid medium.

If the solvent used in the method of this invention is an organic amine, it is advantageously selected from the group consisting of methylamines, ethylamines, propylamines, and butylamines. Advantageously, the method of this invention is carrier out wherein the organic amine is a liquid. Preferably the contacting step of the present method is carrier out at a temperature of from about minus 25° C. to about 100° C. Preferably the contacting step is carried out from a temperature of from about 20° C. to about 90° C.

If the solvent used in the method of this invention is a pyridine or a substituted pyridine, the contacting step is advantageously carried out at a temperature from about minus 5° C. to about 190° C. Preferably when using pyridine or a substituted pyridine as the solvent the contacting step is carrier out at a temperature of from about 30° C. to about 165° C.

As discussed above, the use for which the $Li_2M_bMn_{2-b}O_4$ prepared by the method of this invention is uniquely applicable is as a cathode for use in a secondary lithium ion electrochemical cell. Such a cell may be of known design having a lithium intercalation anode, a suitable nonaqueous electrolyte, a cathode of material made by the method of this invention, and a separator between the anode and the cathode. The anode may be of known materials such as transition metal oxides, transition metal sulfides and carbonaceous materials. The nonaqueous electrolyte can be in the form of a liquid, a gel or a solid matrix that contains mobile lithium ions.

The lithiated multicomponent metal oxide is represented by the formula $Li_2M_bMn_{2-b}O_4$ wherein M is a metal other than manganese, and advantageously b is from about 0.001 to about 1.999. Preferably b is from about 0.001 to about 0.20. Advantageously the metal M is selected from the group consisting of Al, Ti, V, Cr, Fe, Co, Ni, and Cu.

Advantageously when the metal is Al b is about 0.2 or less.

Advantageously when the metal is Ti b is about 0.2 or less.

Advantageously when the metal is Cr b is about 0.2 or less.

Advantageously when the metal is Fe b is about 0.5 or less.

Advantageously when the metal is Co b is about 0.2 or less.

Advantageously when the metal is Ni b is about 0.2 or less.

Advantageously when the metal is Ni b is about 0.5 or less.

Advantageously when the metal is Ni b is from about 0.5 to about 1.99.

Advantageously when the metal is Ni b is about 1.10 or less.

Advantageously when the metal is Cu b is about 0.2 or less.

Advantageously when the metal is V b is about 0.2 or less.

The process of the present invention can optionally be practiced by providing an electron-transfer catalyst to the suspension of $LiM_bMn_{2-4}O_4$ before or after the addition of lithium. Advantageously, the catalyst is selected from the group consisting of sulfur, sulfides, reducible sulfur compounds, iodine, iodides, reducible iodine compounds, pyridine, pyridine derivatives, and benzophenone.

Products were analyzed by X-ray powder diffraction. The materials $Li_2M_bMn_{2-b}O_4$ tend to react with oxygen and water from the air. To avoid decomposition during X-ray analysis, the sample plaques were prepared in an inert-atmosphere box, and a hydrocarbon oil (3-in-1 Household Oil™) was mixed with the sample before the plaque was pressed. This procedure afforded excellent protection.

The formation of products $Li_2M_bMn_{2-b}O_4$ was inferred from the presence of X-ray diffraction peaks closely approximating those of the known compound $Li_2Mn_2O_4$, as described on card 38-299 of the Powder Diffraction File described above. The results are reported in the Tables.

EXAMPLE 1

The experiments of Example 1 demonstrate the conversion of $LiM_{0.2}Mn_{1.8}O_4$ to $Li_2M_{0.2}Mn_{1.8}O_4$ (M=Al, Ti, V, Cr, Fe, Co, Ni, and Cu) by reaction with elemental lithium in a liquid ammonia medium.

To an argon-purged Schlenk tube were charged 50 mmoles (about 9.0 grams) of $LiM_{0.2}Mn_{1.8}O_4$ and about 50 ml of liquid ammonia. Stirring was effected using a magnetically driven bar. Throughout the course of the experiment a dry-ice—acetone bath was periodically raised under the Schlenk tube to control the rate of ammonia vaporization by maintaining the temperature between the normal boiling point and about −40° C. The Schlenk tube was vented to the atmosphere through a mineral oil filled bubbler. In a dry box, about 0.35 grams (50 mmoles) of lithium ribbon were cut into small pieces and placed in a tightly stoppered Erlenmeyer flask. The lithium was subsequently charged to the Schlenk tube in a protective counter-flow of argon.

Reaction was rapid. The blue color of lithium dissolved in ammonia was evident immediately. Within less than about 2 hours, the blue color was discharged, all of the lithium was consumed, and the solid powder became yellow-brown. Thereafter, the liquid ammonia was allowed to evaporate. The product was further dried in an oil-pump vacuum, while heat was supplied to the sample from several turns of electric heating tape. The dried powder was transferred to a glass jar in an inert atmosphere box and analyzed by X-ray powder diffraction as described above. The results are reported in Table 1.

TABLE 1

$Li_2M_{0.2}Mn_{1.8}O_4$ Preparation Experiments in Ammonia

| M | $LiM_{0.2}Mn_{1.8}O_4$ | T, °C. | Time, hour | Principal Product |
|---|---|---|---|---|
| Al | $LiAl_{0.2}Mn_{1.8}O_4$ | −33 | <2 | Primarily $Li_2Al_{0.2}Mn_{1.8}O_4$ |
| Ti | $LiT_{0.2}Mn_{1.8}O_4$ | −33 | <2 | Primarily $Li_2Ti_{0.2}Mn_{1.8}O_4$ |
| V | $LiV_{0.2}Mn_{1.8}O_4$ | −33 | <2 | Primarily $Li_2V_{0.2}Mn_{1.8}O_4$ |
| Cr | $LiCr_{0.2}Mn_{1.8}O_4$ | −33 | <2 | Primarily $Li_2Cr_{0.2}Mn_{1.8}O_4$ |
| Fe | $LiFe_{0.2}Mn_{1.8}O_4$ | −33 | <2 | Primarily $Li_2Fe_{0.2}Mn_{1.8}O_4$ |
| Co | $LiCo_{0.2}Mn_{1.8}O_4$ | −33 | <2 | Primarily $Li_2Co_{0.2}Mn_{1.8}O_4$ |
| Ni | $LiNi_{0.2}Mn_{1.8}O_4$ | −33 | <2 | Primarily $Li_2Ni_{0.2}Mn_{1.8}O_4$ |
| Cu | $LiCu_{0.2}Mn_{1.8}O_4$ | −33 | <2 | Primarily $Li_2Cu_{0.2}Mn_{1.8}O_4$ |

EXAMPLE 2

The experiments of Example 2 demonstrate the conversion of $LiM_{0.2}Mn_{1.8}O_4$ to $Li_2Mn_{0.2}Mn_{1.8}O_4$ (M=Al, Ti, V, Cr, Fe, Co, Ni, and Cu) by reaction with elemental lithium in n-propylamine.

To an argon-purged Schlenk tube were charged 50 mmoles (about 9.0 grams) of $LiM_{0.2}Mn_{1.8}O_4$ and about 50 ml of n-propylamine. Stirring was effected using a magnetically driven bar. Heating was effected using a thermostatted oil bath. The Schlenk tube was vented to the atmosphere through a mineral oil filled bubbler. In a dry box, about 0.35 grams (50 mmoles) of lithium ribbon were cut into small pieces and placed in a tightly stoppered Erlenmeyer flask. The lithium was subsequently charged to the Schlenk tube in a protective counter-flow of argon.

The reaction mixture was warmed to maintain a slow reflux of n-propylamine on the aircooled walls of the Schlenk tube (about 49° C.). Reaction was relatively slow. Over about 24 hours, the lithium was consumed, and the solid powder became yellow-brown. Thereafter, the product was recovered by filtration in an oven-dried Schlenk filter tube under an atmosphere of argon. The wet filter cake was washed on the flit with about 50 ml of tetrahydrofuran. Thereafter, the superficially dry filter cake was dried in the Schienk filter tube; the tube was evacuated with an oil pump and heated with several turns of electric heating tape. The dried powder was transferred to a glass jar in an inert atmosphere box and analyzed by X-ray powder diffraction as described above. The results are reported in Table 2.

TABLE 2

$Li_2M_{0.2}Mn_{1.8}O_4$ Preparation Experiments in n-Propylamine

| M | $LiM_{0.2}Mn_{1.8}O_4$ | T, °C. | Time, hour | Principal Product |
|---|---|---|---|---|
| Al | $LiAl_{0.2}Mn_{1.8}O_4$ | 110 | <24 | Primarily $Li_2Al_{0.2}Mn_{1.8}O_4$ |
| Ti | $LiT_{0.2}Mn_{1.8}O_4$ | 110 | <24 | Primarily $Li_2Ti_{0.2}Mn_{1.8}O_4$ |
| V | $LiV_{0.2}Mn_{1.8}O_4$ | 110 | <24 | Primarily $Li_2V_{0.2}Mn_{1.8}O_4$ |
| Cr | $LiCr_{0.2}Mn_{1.8}O_4$ | 110 | <24 | Primarily $Li_2Cr_{0.2}Mn_{1.8}O_4$ |
| Fe | $LiFe_{0.2}Mn_{1.8}O_4$ | 110 | <24 | Primarily $Li_2Fe_{0.2}Mn_{1.8}O_4$ |
| Co | $LiCo_{0.2}Mn_{1.8}O_4$ | 110 | <24 | Primarily $Li_2Co_{0.2}Mn_{1.8}O_4$ |
| Ni | $LiNi_{0.2}Mn_{1.8}O_4$ | 110 | <24 | Primarily $Li_2Ni_{0.2}Mn_{1.8}O_4$ |
| Cu | $LiCu_{0.2}Mn_{1.8}O_4$ | 110 | <24 | Primarily $Li_2Cu_{0.2}Mn_{1.8}O_4$ |

EXAMPLE 3

The experiments of Example 3 demonstrate the conversion of $LiM_{0.2}Mn_{1.8}O_4$ to $Li_2M_{0.2}Mn_{1.8}O_4$(M=Al, Ti, V, Cr, Fe, Co, Ni, and Cu) by reaction with elemental lithium in pyridine.

To an argon-purged Schlenk tube were charged 50 mmoles (about 9.0 grams) of $LiM_{0.2}Mn_{1.8}O_4$ and about 50 ml of pyridine. Stirring was effected using a magnetically driven bar. Heating was effected using a thermostatted oil bath. The Schlenk tube was vented to the atmosphere through a mineral oil filled bubbler. In a dry box, about 0.35 grams (50 mmoles) of lithium ribbon were cut into small pieces and placed in a tightly stoppered Erlenmeyer flask. The lithium was subsequently charged to the Schlenk tube in a protective counter-flow of argon.

The reaction mixture was warmed to about 80° C. Reaction was rapid. Over about 1 hour, the lithium was consumed, and the solid powder became yellow-brown. Thereafter, the product was recovered by filtration in an oven-dried Schlenk filter tube under an atmosphere of argon. The wet filter cake was washed on the frit with about 50 ml of tetrahydrofuran. Thereafter the superficially dry filter cake was dried in the Schlenk filter tube; the tube was evacuated with an oil pump and heated with several turns of electric heating tape. The dried powder was transferred to a glass jar in an inert atmosphere box and analyzed by X-ray powder diffraction as described above. The results are reported in Table 3.

TABLE 3

$Li_2M_{0.2}Mn_{1.8}O_4$ Preparation Experiments in Pyridine

| M | $LiM_{0.2}Mn_{1.8}O_4$ | T, °C. | Time, hour | Principal Product |
|---|---|---|---|---|
| Al | $LiAl_{0.2}Mn_{1.8}O_4$ | 80 | <1 | Primarily $Li_2Al_{0.2}Mn_{1.8}O_4$ |
| Ti | $LiT_{0.2}Mn_{1.8}O_4$ | 80 | <1 | Primarily $Li_2Ti_{0.2}Mn_{1.8}O_4$ |
| V | $LiV_{0.2}Mn_{1.8}O_4$ | 80 | <1 | Primarily $Li_2V_{0.2}Mn_{1.8}O_4$ |
| Cr | $LiCr_{0.2}Mn_{1.8}O_4$ | 80 | <1 | Primarily $Li_2Cr_{0.2}Mn_{1.8}O_4$ |
| Fe | $LiFe_{0.2}Mn_{1.8}O_4$ | 80 | <1 | Primarily $Li_2Fe_{0.2}Mn_{1.8}O_4$ |
| Co | $LiCo_{0.2}Mn_{1.8}O_4$ | 80 | <1 | Primarily $Li_2Co_{0.2}Mn_{1.8}O_4$ |
| Ni | $LiNi_{0.2}Mn_{1.8}O_4$ | 80 | <1 | Primarily $Li_2Ni_{0.2}Mn_{1.8}O_4$ |
| Cu | $LiCu_{0.2}Mn_{1.8}O_4$ | 80 | <1 | Primarily $Li_2Cu_{0.2}Mn_{1.8}O_4$ |

EXAMPLE 4

The experiments of Example 4 demonstrate the conversion of $LiM_{0.2}Mn_{1.8}O_4$ to $Li_2M_{0.2}Mn_{1.8}O_4$(M=Al, Ti, V, Cr, Fe, Co, Ni, and Cu) by reaction with elemental lithium in 1,2-diethoxyethane and pyridine.

To an argon-purged Schlenk tube were charged 50 mmoles (about 9.0 grams) of $LiM_{0.2}Mn_{1.8}O_4$, about 40 ml of 1,2-diethoxyethane, and about 10 ml of pyridine. Stirring was effected using a magnetically driven bar. Heating was effected using a thermostatted oil bath. The Schlenk tube was vented to the atmosphere through a mineral oil filled bubbler. In a dry box, about 0.35 grams (50 mmoles) of lithium ribbon were cut into small pieces and placed in a tightly stoppered Edenmeyer flask. The lithium was subsequently charged to the Schlenk tube in a protective counter-flow of argon.

The reaction mixture was warmed to about 110° C. Reaction was somewhat slower than for the corresponding reaction in pure pyridine. Over about 4 hour, the lithium was consumed, and the solid powder became yellow-brown. Thereafter, the product was recovered by filtration in an oven-dried Schlenk filter tube under an atmosphere of argon. The wet filter cake was washed on the frit with about 50 ml of tetrahydrofuran. Thereafter the superficially dry filter cake was dried in the Schlenk filter tube; the tube was evacuated with an oil pump and heated with several turns of electric heating tape. The dried powder was transferred to a glass jar in an inert atmosphere box and analyzed by X-ray powder diffraction as described above. The results are reported in Table 4.

TABLE 4

Li$_2$M$_{0.2}$Mn$_{1.8}$O$_4$ Preparation Experiments
in
1,2-Diethoxylethane with Pyridine Catalyst

| M | LiM$_{0.2}$Mn$_{1.8}$O$_4$ | T, °C. | Time, hour | Principal Product |
|---|---|---|---|---|
| Al | LiAl$_{0.2}$Mn$_{1.8}$O$_4$ | 110 | <4 | Primarily Li$_2$Al$_{0.2}$Mn$_{1.8}$O$_4$ |
| Ti | LiT$_{0.2}$Mn$_{1.8}$O$_4$ | 110 | <4 | Primarily Li$_2$Ti$_{0.2}$Mn$_{1.8}$O$_4$ |
| V | LiV$_{0.2}$Mn$_{1.8}$O$_4$ | 110 | <4 | Primarily Li$_2$V$_{0.2}$Mn$_{1.8}$O$_4$ |
| Cr | LiCr$_{0.2}$Mn$_{1.8}$O$_4$ | 110 | <4 | Primarily Li$_2$Cr$_{0.2}$Mn$_{1.8}$O$_4$ |
| Fe | LiFe$_{0.2}$Mn$_{1.8}$O$_4$ | 110 | <4 | Primarily Li$_2$Fe$_{0.2}$Mn$_{1.8}$O$_4$ |
| Co | LiCo$_{0.2}$Mn$_{1.8}$O$_4$ | 110 | <4 | Primarily Li$_2$Co$_{0.2}$Mn$_{1.8}$O$_4$ |
| Ni | LiNi$_{0.2}$Mn$_{1.8}$O$_4$ | 110 | <4 | Primarily Li$_2$Ni$_{0.2}$Mn$_{1.8}$O$_4$ |
| Cu | LiCu$_{0.2}$Mn$_{1.8}$O$_4$ | 110 | <4 | Primarily Li$_2$Cu$_{0.2}$Mn$_{1.8}$O$_4$ |

EXAMPLE 5

The experiments of Example 5 demonstrate the conversion of LiM$_{0.2}$Mn$_{1.8}$O$_4$ to Li$_2$M$_{0.2}$Mn$_{1.8}$O$_4$(M=Al, Ti, V, Cr, Fe, Co, Ni, and Cu) by reaction with elemental lithium in 1,2-diethoxyethane containing benzophenone as an electron-transfer catalyst.

To an argon-purged Schlenk tube were charged 50 mmoles (about 9.0 grams) of LiM$_{0.2}$Mn$_{1.8}$O$_4$, about 50 ml of 1,2-diethoxyethane, and about 0.5 grams of benzophenone. Stirring was effected using a magnetically driven bar. Heating was effected using a thermostatted oil bath. The Schlenk tube was vented to the atmosphere through a mineral oil filled bubbler. In a dry box, about 0.35 grams (50 mmoles) of lithium ribbon were cut into small pieces and placed in a tightly stoppered Eriemeyer flask. The lithium was subsequently charged to the Schlenk tube in a protective counter-flow of argon.

The reaction mixture was warmed to about 110° C. Reaction was somewhat slower than for the corresponding reaction in which the catalyst was pyridine. Over about 8 hour, the lithium was consumed, and the solid powder became yellow-brown. Thereafter, the product was recovered by filtration in an oven-dried Schlenk filter tube under an atmosphere of argon. The wet filter cake was washed on the frit with about 50 ml of tetrahydrofuran. Thereafter the superficially dry filter cake was dried in the Schlenk filter tube; the tube was evacuated with an oil pump and heated with several turns of electric heating tape. The dried powder was transferred to a glass jar in an inert atmosphere box and analyzed by X-ray powder diffraction as described above. The results are reported in Table 5.

TABLE 5

Li$_2$M$_{0.2}$Mn$_{1.8}$O$_4$ Preparation Experiments
in
1,2-Diethoxylethane with Benzophenone Catalyst

| M | LiM$_{0.2}$Mn$_{1.8}$O$_4$ | T, °C. | Time, hour | Principal Product |
|---|---|---|---|---|
| Al | LiAl$_{0.2}$Mn$_{1.8}$O$_4$ | 110 | <8 | Primarily Li$_2$Al$_{0.2}$Mn$_{1.8}$O$_4$ |
| Ti | LiT$_{0.2}$Mn$_{1.8}$O$_4$ | 110 | <8 | Primarily Li$_2$Ti$_{0.2}$Mn$_{1.8}$O$_4$ |
| V | LiV$_{0.2}$Mn$_{1.8}$O$_4$ | 110 | <8 | Primarily Li$_2$V$_{0.2}$Mn$_{1.8}$O$_4$ |
| Cr | LiCr$_{0.2}$Mn$_{1.8}$O$_4$ | 110 | <8 | Primarily Li$_2$Cr$_{0.2}$Mn$_{1.8}$O$_4$ |
| Fe | LiFe$_{0.2}$Mn$_{1.8}$O$_4$ | 110 | <8 | Primarily Li$_2$Fe$_{0.2}$Mn$_{1.8}$O$_4$ |
| Co | LiCo$_{0.2}$Mn$_{1.8}$O$_4$ | 110 | <8 | Primarily Li$_2$Co$_{0.2}$Mn$_{1.8}$O$_4$ |
| Ni | LiNi$_{0.2}$Mn$_{1.8}$O$_4$ | 110 | <8 | Primarily Li$_2$Ni$_{0.2}$Mn$_{1.8}$O$_4$ |
| Cu | LiCu$_{0.2}$Mn$_{1.8}$O$_4$ | 110 | <8 | Primarily Li$_2$Cu$_{0.2}$Mn$_{1.8}$O$_4$ |

EXAMPLE 6

The experiments of Example 6 demonstrate the conversion of LiM$_{0.2}$Mn$_{1.8}$O$_4$ to Li$_2$M$_{0.2}$Mn$_{1.8}$O$_4$(M=Al, Ti, V, Cr, Fe, Co, Ni, and Cu) by reaction with elemental lithium in 1,2-diethoxyethane containing elemental sulfur as an electron-transfer catalyst.

To an argon-purged Schlenk tube were charged 50 mmoles (about 9.0 grams) of LiM$_{0.2}$Mn$_{1.8}$O$_4$, about 50 ml of 1,2-diethoxyethane, and about 0.2 grams of finely divided elemental sulfur. Stirring was effected using a magnetically driven bar. Heating was effected using a thermostatted oil bath. The Schlenk tube was vented to the atmosphere through a mineral oil filled bubbler. In a dry box, about 0.35 grams (50 mmoles) of lithium ribbon were cut into small pieces and placed in a tightly stoppered Erlenmeyer flask. The lithium was subsequently charged to the Schlenk tube in a protective counter-flow of argon.

The reaction mixture was warmed to about 110° C. Reaction occurred smoothly over about 8 hour; the lithium was consumed, and the solid powder became yellow-brown. Thereafter, the product was recovered by filtration in an oven-dried Schlenk filter tube under an atmosphere of argon. The wet filter cake was washed on the frit with about 50 ml of tetrahydrofuran. Therefore the superficially dry filter cake was dried in the Schlenk filter tube; the tube was evacuated with an oil pump and heated with several turns of electric heating tape. The sulfur vaporized from the product during the drying step and collected on cooler portions of the wall of the filter tube. The dried powder was easily separated from the sulfur, which remained tightly adherent to the wall. The product was transferred to a glass jar in an inert atmosphere box and analyzed by X-ray powder diffraction as described above. The results are reported in Table 6.

TABLE 6

Li$_2$M$_{0.2}$Mn$_{1.8}$O$_4$ Preparation Experiments
in
1,2-Diethoxylethane with Sulfur Catalyst

| M | LiM$_{0.2}$Mn$_{1.8}$O$_4$ | T, °C. | Time, hour | Principal Product |
|---|---|---|---|---|
| Al | LiAl$_{0.2}$Mn$_{1.8}$O$_4$ | 110 | <8 | Primarily Li$_2$Al$_{0.2}$Mn$_{1.8}$O$_4$ |
| Ti | LiT$_{0.2}$Mn$_{1.8}$O$_4$ | 110 | <8 | Primarily Li$_2$Ti$_{0.2}$Mn$_{1.8}$O$_4$ |
| V | LiV$_{0.2}$Mn$_{1.8}$O$_4$ | 110 | <8 | Primarily Li$_2$V$_{0.2}$Mn$_{1.8}$O$_4$ |

TABLE 6-continued

Li$_2$M$_{0.2}$Mn$_{1.8}$O$_4$ Preparation Experiments in 1,2-Diethoxylethane with Sulfur Catalyst

| M | LiM$_{0.2}$Mn$_{1.8}$O$_4$ | T, °C. | Time, hour | Principal Product |
|---|---|---|---|---|
| Cr | LiCr$_{0.2}$Mn$_{1.8}$O$_4$ | 110 | <8 | Primarily Li$_2$Cr$_{0.2}$Mn$_{1.8}$O$_4$ |
| Fe | LiFe$_{0.2}$Mn$_{1.8}$O$_4$ | 110 | <8 | Primarily Li$_2$Fe$_{0.2}$Mn$_{1.8}$O$_4$ |
| Co | LiCo$_{0.2}$Mn$_{1.8}$O$_4$ | 110 | <8 | Primarily Li$_2$Co$_{0.2}$Mn$_{1.8}$O$_4$ |
| Ni | LiNi$_{0.2}$Mn$_{1.8}$O$_4$ | 110 | <8 | Primarily Li$_2$Ni$_{0.2}$Mn$_{1.8}$O$_4$ |
| Cu | LiCu$_{0.2}$Mn$_{1.8}$O$_4$ | 110 | <8 | Primarily Li$_2$Cu$_{0.2}$Mn$_{1.8}$O$_4$ |

EXAMPLE 7

The experiments of Example 7 demonstrate the conversion of LiM$_{0.2}$Mn$_{1.8}$O$_4$ to Li$_2$M$_{0.2}$Mn$_{1.8}$O$_4$(M=Al, Ti, V, Cr, Fe, Co, Ni, and Cu) by reaction with elemental lithium in 1,2-diethoxyethane containing elemental iodine as an electron-transfer catalyst.

To an argon-purged Schlenk tube were charged 50 mmoles (about 9.0 grams) of LiM$_{0.2}$Mn$_{1.8}$O$_4$ about 50 ml of 1,2-diethoxyethane, and about 0.2 grams of elemental iodine. Stirring was effected using a magnetically driven bar. Heating was effected using a thermostatted oil bath. The Schlenk tube was vented to the atmosphere through a mineral oil filled bubbler. In a dry box, about 0.35 grams (50 mmoles) of lithium ribbon were cut into small pieces and placed in a tightly stoppered Erlenmeyer flask. The lithium was subsequently charged to the Schlenk tube in a protective counter-flow of argon.

The reaction mixture was warmed to about 110° C. Reaction occurred smoothly over about 8 hour; the lithium was consumed, and the solid powder became yellow-brown. Thereafter, the product was recovered by filtration in an oven-dried Schlenk filter tube under an atmosphere of argon. The wet filter cake was washed on the frit with about 50 ml of tetrahydrofuran. Thereafter the superficially dry filter cake was dried in the Schlenk filter tube; the tube was evacuated with an oil pump and heated with several turns of electric heating tape. The product was transferred to a glass jar in an inert atmosphere box and analyzed by X-ray powder diffraction as described above. The results are reported in Table 7.

TABLE 7

Li$_2$M$_{0.2}$Mn$_{1.8}$O$_4$ Preparation Experiments in 1,2-Diethoxylethane with Iodine Catalyst

| M | LiM$_{0.2}$Mn$_{1.8}$O$_4$ | T, °C. | Time, hour | Principal Product |
|---|---|---|---|---|
| Al | LiAl$_{0.2}$Mn$_{1.8}$O$_4$ | 110 | <8 | Primarily Li$_2$Al$_{0.2}$Mn$_{1.8}$O$_4$ |
| Ti | LiTi$_{0.2}$Mn$_{1.8}$O$_4$ | 110 | <8 | Primarily Li$_2$Ti$_{0.2}$Mn$_{1.8}$O$_4$ |
| V | LiV$_{0.2}$Mn$_{1.8}$O$_4$ | 110 | <8 | Primarily Li$_2$V$_{0.2}$Mn$_{1.8}$O$_4$ |
| Cr | LiCr$_{0.2}$Mn$_{1.8}$O$_4$ | 110 | <8 | Primarily Li$_2$Cr$_{0.2}$Mn$_{1.8}$O$_4$ |
| Fe | LiFe$_{0.2}$Mn$_{1.8}$O$_4$ | 110 | <8 | Primarily Li$_2$Fe$_{0.2}$Mn$_{1.8}$O$_4$ |
| Co | LiCo$_{0.2}$Mn$_{1.8}$O$_4$ | 110 | <8 | Primarily Li$_2$Co$_{0.2}$Mn$_{1.8}$O$_4$ |
| Ni | LiNi$_{0.2}$Mn$_{1.8}$O$_4$ | 110 | <8 | Primarily Li$_2$Ni$_{0.2}$Mn$_{1.8}$O$_4$ |
| Cu | LiCu$_{0.2}$Mn$_{1.8}$O$_4$ | 110 | <8 | Primarily Li$_2$Cu$_{0.2}$Mn$_{1.8}$O$_4$ |

What is claimed is:

1. A method for manufacturing Li$_2$M$_b$Mn$_{2-b}$O$_4$ comprising the steps of:
   a. Providing LiM$_b$Mn$_{2-b}$O$_4$ wherein M is selected from the group consisting of Al, Ti, V, Cr, Fe, Co, Ni, and Cu and b is from about 0.001 to about 1.999;
   b. Providing a source of lithium;
   c. Providing a liquid medium in which lithium generates solvated electrons or the reduced form of an electron-transfer catalyst;
   d. Dissolving lithium from the lithium source in the liquid medium; and
   e. contacting the LiM$_b$Mn$_{2-b}$O$_4$ with the liquid medium containing the dissolved lithium and the solvated electrons or the reduced form of the electron-transfer catalyst.

2. The method of claim 1 wherein the liquid medium is selected from the group consisting of ammonia, organic amines, ethers, pyridine, substituted pyridines, mixtures of ammonia and amines, and mixtures of ammonia and ethers.

3. The method of claim 2 wherein the liquid medium is ammonia.

4. The method of claim 3 wherein the temperature during the contacting step is maintained at from about minus 30° C. to about minus 50° C.

5. The method of claim 4 wherein the temperature during the contacting step is maintained at from about minus 33° C. to about minus 45° C.

6. The method of claim 2 wherein the liquid medium is an organic amine.

7. The method of claim 6 wherein the contacting step is carried out at a temperature of from about minus 25° C. to about 100° C.

8. The method of claim 7 wherein the contacting step is carried out at a temperature of from about 20° C. to about 90° C.

9. The method of claim 6 wherein the organic amine is selected from the group consisting of methylamines, ethylamines, propylamines and butylamines.

10. The method of claim 6 wherein the organic amine is a liquid.

11. The method of claim 2 wherein the solvent is pyridine.

12. The method of claim 11 wherein the contacting step is carried out at a temperature of from about minus 5° C. to about 190° C.

13. The method of claim 12 wherein the contacting step is carried out at a temperature of from about 35° C. to about 125° C.

14. The method of claim 2 wherein the liquid medium is a substituted pyridine.

15. The method of claim 14 wherein the contacting step is carried out at a temperature of from about minus 5° C. to about 190° C.

16. The method of claim 15 wherein the contacting step is carried out at a temperature of from about 35° C. to about 165° C.

17. The method of claim 2 wherein the liquid medium is a mixture of ammonia and amines.

18. The method of claim 2 wherein the liquid medium is a mixture of ammonia and ethers.

19. The method of claim 2 wherein the solvent is an ether.

20. The method of claim 1 including the step of adding a catalyst to the $LiM_bMn_{2-b}O_4$ prior to step (b).

21. The method of claim 1 including the step of adding a catalyst to the $LiM_bMn_{2-b}O_4$ prior to step (c).

22. The method of claim 1 including the step of adding a catalyst to the $LiM_bMn_{2-b}O_4$ immediately prior to step (d).

23. The method of claim 1 including the step of adding a catalyst to the $LiM_bMn_{2-b}O_4$ immediately after step (d).

24. The method of claim 20 wherein the catalyst is selected from the group consisting of sulfur, sulfides, reducible sulfur compounds, iodine, iodides, reducible iodine compounds, pyridine, pyridine derivatives, and benzophenone.

25. The method of claim 21 wherein the catalyst is selected from the group consisting of sulfur, sulfides, reducible sulfur compounds, iodine, iodides, reducible iodine compounds, pyridine, pyridine derivatives, and benzophenone.

26. The method of claim 22 wherein the catalyst is selected from the group consisting of sulfur, sulfides, reducible sulfur compounds, iodine, iodides, reducible iodine compounds, pyridine, pyridine derivatives, and benzophenone.

27. The method of claim 23 wherein the catalyst is selected from the group consisting of sulfur, sulfides, reducible sulfur compounds, iodine, iodides, reducible iodine compounds, pyridine, pyridine derivatives, and benzophenone.

28. A cathode for use in a secondary lithium ion electrochemical cell which is produced by $Li_2M_bMn_{2-b}O_4$ produced by the method of claim 1.

29. A secondary lithium ion electrochemical cell comprising a lithium intercalation anode, a suitable nonaqueous electrolyte, a cathode as defined in claim 28, and a separator between the anode and the cathode.

30. An electrochemical cell according to claim 29 wherein the anode comprises a material selected from the group consisting of transition metal oxides, transition metal sulfides and carbonaceous material, and wherein the electrolyte is in liquid form.

31. A cathode for use in a secondary lithium ion electrochemical cell which is produced using $Li_2M_bMn_{2-b}O_4$ produced by the method of claim 6.

32. A secondary lithium ion electrochemical cell comprising a lithium intercalation anode, a suitable nonaqueous electrolyte, a cathode as defined in claim 31, and a separator between the anode and the cathode.

33. An electrochemical cell according to claim 32 wherein the anode comprises a material selected from the group consisting of transition metal oxides, transition metal sulfides and carbonaceous material, and wherein the electrolyte is in liquid form.

34. The method of claim 1 wherein the liquid medium is a solvent having an electron transfer catalyst dissolved therein.

35. The method of claim 34 wherein the liquid medium is a mixture of compounds which is a liquid at the reaction temperature.

36. The method of claim 34 wherein the catalyst is selected from the group consisting of sulfur, sulfides, reducible sulfur compounds, iodine, iodides, reducible iodine compounds, pyridine, pyridine derivatives, and benzophenone.

37. The method of claim 1 where b is from about 0.001 to about 0.20.

38. The method of claim 1, wherein M is Al and b is about 0.2 or less.

39. The method of claim 1 wherein M is Ti and b is about 0.2 or less.

40. The method of claim 1 wherein M is Cr and b is about 0.2 or less.

41. The method of claim 1 wherein M is Fe and b is about 0.5 or less.

42. The method of claim 1 wherein M is Co and b is about 0.2 or less.

43. The method of claim 1 wherein M is Ni and b is about 0.2 or less.

44. The method of claim 1 wherein M is Ni and b is about 0.5 or less.

45. The method of claim 1 wherein M is Ni and b is from about 0.5 to about 1.99.

46. The method of claim 1 wherein M is Ni and b is about 1.10 or less.

47. The method of claim 1 wherein M is Cu and b is about 0.2 or less.

48. The method of claim 1 wherein M is V and b is about 0.2 or less.

* * * * *

UNITED STATES PATENT AND TRADEMARK OFFICE
CERTIFICATE OF CORRECTION

PATENT NO. : 5,605,773
DATED : February 25, 1997
INVENTOR(S) : Paul C. Ellgen

It is certified that error appears in the above-indentified patent and that said Letters Patent is hereby corrected as shown below:

Column 4, line 54, delete "carrier" and insert --carried--

Column 7, line 14, delete "flit" and insert --frit--

Column 9, line 39, delete "Eriemeyer" and insert --Erlenmeyer--

Signed and Sealed this

Fourteenth Day of October, 1997

Attest:

BRUCE LEHMAN

Attesting Officer

Commissioner of Patents and Trademarks